(12) United States Patent
Col et al.

(10) Patent No.: US 6,338,136 B1
(45) Date of Patent: Jan. 8, 2002

(54) PAIRING OF LOAD-ALU-STORE WITH CONDITIONAL BRANCH

(75) Inventors: Gerard M. Col; Rodney E. Hooker, both of Austin, TX (US)

(73) Assignee: IP-First, LLC, Austin, TX (US)

( * ) Notice: Subject to any disclaimer, the term of this patent is extended or adjusted under 35 U.S.C. 154(b) by 0 days.

(21) Appl. No.: 09/313,908

(22) Filed: May 18, 1999

(51) Int. Cl.$^7$ .......................... G06F 9/302; G06F 9/305; G06F 9/312

(52) U.S. Cl. ...................... 712/221; 712/248; 712/242; 712/245; 712/210; 712/234; 711/102

(58) Field of Search .................. 712/245, 241, 712/234, 246, 210, 243, 233, 223, 211, 24, 221, 240, 242, 248, 213; 717/9; 711/102

(56) References Cited

U.S. PATENT DOCUMENTS 5,127,092 A * 6/1992 Gupta et al. ................. 712/234
5,202,995 A * 4/1993 O'Brien .......................... 717/9
5,983,344 A * 11/1999 Henry et al. ................. 712/245

* cited by examiner

Primary Examiner—Daniel H. Pan
(74) Attorney, Agent, or Firm—Richard K. Huffman; James W. Huffman

(57) ABSTRACT

An apparatus and method are provided for executing a compare-and-jump operation in a pipeline microprocessor. Typically, the compare-and-jump operation is specified by two micro instructions. The first micro instruction, an ALU micro instruction, directs the microprocessor to perform an ALU operation, resulting in update of a flags register. The second micro instruction, a conditional jump micro instruction, directs the microprocessor to examine the flags register and to branch program control to a target address if a prescribed condition is met. The apparatus has a jump combiner that detects the ALU micro instruction and the conditional jump micro instruction in a micro instruction queue. The jump combiner indicates the prescribed condition for the conditional branch in a field of the ALU micro instruction, and then deletes the conditional jump micro instruction from the queue. The apparatus also has execution logic that performs the ALU operation, generates the result, and updates the flags register. The apparatus also has store logic that receives the generated result and examines the flags register as prescribed by the field of the single ALU micro instruction.

24 Claims, 8 Drawing Sheets

FIG. 3 (Related Art)

*Execution of Load-ALU-Store (LAS) and Load-ALU-Store-Jump (LASJ) Instructions* /300

| Cycle | Fetch | Translate | Register | Address | Data/ALU | Write Back | |
|---|---|---|---|---|---|---|---|
| 1 | ADD [BX],AX | *** | *** | *** | *** | *** | |
| 2 | *** | ADD [BX],AX | *** | *** | *** | *** | |
| 3 | *** | *** | LD T1,[BX] | *** | *** | *** | |
| 4 | *** | *** | ADD T1,AX | LD T1,[BX] | *** | *** | |
| 5 | *** | *** | ST [BX],T1 | ADD T1,AX | LD T1,[BX] | *** | |
| 6 | *** | *** | *** | ST [BX],T1 | ADD T1,AX | LD T1,[BX] | ↑ |
| 7 | *** | *** | *** | *** | ST [BX],T1 | ADD T1,AX | 3 cycles |
| 8 | *** | *** | *** | *** | *** | ST [BX],T1 | ↓ |
| 11 | ADD [BX],AX | *** | *** | *** | *** | *** | |
| 12 | Jcc TGT | ADD [BX],AX | *** | *** | *** | *** | |
| 13 | *** | Jcc TGT | LD T1,[BX] | *** | *** | *** | |
| 14 | *** | *** | ADD T1,AX | LD T1,[BX] | *** | *** | |
| 15 | *** | *** | ST [BX],T1 | ADD T1,AX | LD T1,[BX] | *** | |
| 16 | *** | *** | Jcc TGT | ST [BX],T1 | ADD T1,AX | LD T1,[BX] | ↑ |
| 17 | *** | *** | *** | Jcc TGT | ST [BX],T1 | ADD T1,AX | 4 cycles |
| 18 | *** | *** | *** | *** | Jcc TGT | ST [BX],T1 | |
| 19 | *** | *** | *** | *** | *** | Jcc TGT | ↓ |

Pipeline Microprocessor Having Separate Load, Execute, and Store Stages

*Pipeline Microprocessor Having Separate Load, Execute, and Store Stages (Con't.)*

FIG. 6

*Improved Load-ALU-Store (LAS) and Load-ALU-Store-Jump (LASJ) Execution* — 600

| Cycle | Fetch | Translate | Register | Address | Load | Execute | Store | Write Back |
|---|---|---|---|---|---|---|---|---|
| 1 | ADD [BX],AX | *** | *** | *** | *** | *** | *** | *** |
| 2 | *** | ADD [BX],AX | *** | *** | *** | *** | *** | *** |
| 3 | *** | *** | LAS [BX],AX | *** | *** | *** | *** | *** |
| 4 | *** | *** | *** | LAS [BX],AX | *** | *** | *** | *** |
| 5 | *** | *** | *** | *** | LAS [BX],AX | *** | *** | *** |
| 6 | *** | *** | *** | *** | *** | LAS [BX],AX | *** | *** |
| 7 | *** | *** | *** | *** | *** | *** | LAS [BX],AX | *** |
| 8 | *** | *** | *** | *** | *** | *** | *** | LAS [BX],AX |
| 11 | ADD [BX],AX | *** | *** | *** | *** | *** | *** | *** |
| 12 | Jcc TGT | ADD [BX],AX | *** | *** | *** | *** | *** | *** |
| 13 | *** | Jcc TGT | LASJ [BX],AX | *** | *** | *** | *** | *** |
| 14 | *** | *** | LASJ [BX],AX | LASJ [BX],AX | *** | *** | *** | *** |
| 15 | *** | *** | *** | *** | LASJ [BX],AX | *** | *** | *** |
| 16 | *** | *** | *** | *** | *** | LASJ [BX],AX | *** | *** |
| 17 | *** | *** | *** | *** | *** | *** | LASJ [BX],AX | *** |
| 18 | *** | *** | *** | *** | *** | *** | *** | *** |
| 19 | | | | | | | | LASJ [BX],AX |

1 cycle

PAIRING OF LOAD-ALU-STORE WITH CONDITIONAL BRANCH

BACKGROUND OF THE INVENTION

1. Field of the Invention

This invention relates in general to the field of instruction execution in computers, and more particularly to an apparatus and method for executing a compare-and-jump operation.

2. Description of the Related Art

Conditional jump instructions are common to all present day microprocessor instruction sets. The conditional jump instruction allows a programmer to direct a microprocessor to evaluate the status of the microprocessor due to execution of previous instructions and to redirect program control flow based upon the findings of the evaluation. Most often, a conditional jump instruction specifies that the contents of a result status register, or flags register, are to be evaluated against a prescribed condition. The flags register contains bits, or flags, that are set when a result is generated by an arithmetic logic unit (ALU) in the microprocessor. The flags are set to indicate the condition of the result. For example, an ALU instruction directing the microprocessor to add two operands would be executed by the ALU and following generation of the sum, the flags register would be updated. If the sum is zero, then a zero flag in the flags register is set. If the sum is a negative number, then a sign flag is set. Use of the conditional jump instruction allows a programmer to make program control decisions about certain attributes, or conditions, of the generated result without having to specifically examine the result itself. The programmer may desire to direct program control to another location if the result is zero, in which case he/she would program a conditional jump instruction following an ALU instruction that prescribes a jump to a target address if the zero flag in the flags register is set.

ALU instructions most often perform operations using operands that are provided to the ALU. These operands can be provided directly by an ALU instruction, they can be provided from a register file within a microprocessor, or they must be first fetched from memory that is external to the microprocessor. In addition, the result of an ALU instruction is either written directly to a register in the microprocessor or it must be stored in a memory location. When an ALU instruction must first be loaded from memory, it is referred to as a load-ALU instruction. If the result is to be stored in memory, the ALU instruction is referred to as an ALU-store instruction. If the operand is to be fetched from memory and the result is to be stored in memory, the ALU instruction is referred to as a load-ALU-store instruction. Instructions such as these are commonly employed by stand alone in application programs and they are also employed in conjunction with conditional jump instructions as described above.

A present day microprocessor is divided into stages, with each stage dedicated to performing a specific function. A programmed instruction is first decoded into an associated sequence of micro instructions, with each micro instruction in the sequence directing the microprocessor to perform a specific task related to an overall operation that is prescribed by the programmed instruction. These micro instructions are placed in a queue and are then synchronously executed in sequential stages of the microprocessor through completion. Micro instructions are specifically designed to operate in accordance with both the capabilities and limitations of a particular microprocessor architecture. A micro instruction cannot prescribe a task that logic within a given stage of the microprocessor cannot perform. Stated differently, translation of an ALU instruction into a corresponding sequence of micro instructions involves decomposition of the operation prescribed by the ALU instruction into discrete tasks, each of which can be executed by a single micro instruction.

One of the limitations of present day microprocessors is that logic to access memory is typically contained within the same stage as the ALU. Hence, a micro instruction can specify a read from memory, a write to memory, or an ALU operation. With rare exception, it cannot specify a combined memory access and ALU operation. This is a problem. Because of this, a load-ALU-store instruction requires translation into three micro instructions: a first micro instruction to load an operand from memory, a second micro instruction to perform the ALU operation, and a third micro instruction to store the result of the operation to memory.

A compare-and-jump operation is specified by immediately following an ALU instruction with a conditional jump instruction. And although the two instructions are related, present day microprocessors treat them independently. The ALU instruction is translated into a sequence of micro instructions directing the ALU operation and the conditional jump instruction is translated into a conditional jump micro instruction directing the microprocessor to evaluate the flags register following generation of the result of the ALU operation. Hence, to perform a compare-and-jump operation involving a load-ALU-store instruction would require four micro instructions: the three micro instructions noted above plus a following conditional jump micro instruction.

The time required to execute any operation on a microprocessor is directly related to the number of micro instructions that are required to implement the operation within the stage design of the microprocessor. In the examples cited above, execution of load-ALU-store operations take three micro instructions; execution of a load-ALU-store-jump operation requires four micro instructions. One skilled in the art will appreciate that an application program that exhibits a significant number of these types of operations will incur notable execution delays, simply because a micro instruction cannot prescribe a combined memory access and ALU task.

Therefore, what is needed is a microprocessor that allows a micro instruction to specify a combined memory access and ALU task.

In addition, what is needed is a microprocessor that can execute a load-ALU-store instruction and a compare-and-jump operation much faster than has heretofore been provided.

Furthermore, what is needed is an apparatus in a microprocessor that allows a single micro instruction to prescribe a load-ALU-store-jump operation.

Moreover, what is needed is a method for combining a conditional jump instruction and an ALU instruction into a single compare-and-jump micro instruction.

To address the above-detailed deficiencies, it is an object of the present invention to provide a microprocessor that can load an operand from memory, perform an ALU operation, and store a result in memory, where all three of these tasks are prescribed by a single micro instruction.

Accordingly, in the attainment of the aforementioned object, it is a feature of the present invention to provide a microprocessor for performing a load-ALU-store operation. The microprocessor includes translation logic, load logic, execution logic, and store logic. The translation logic receives a load-ALU-store macro instruction and decodes the load-ALU-store macro instruction into a load-ALU-store micro instruction. The load-ALU-store micro instruction directs the microprocessor to retrieve an operand from a location in memory, to perform an ALU operation using the operand, and to store a result to the location in the memory. The load logic is coupled to the translation logic and retrieves the operand from the location. The execution logic is coupled to the load logic. The execution logic performs the ALU operation and provides the result. The store logic is coupled to the execution logic. The store logic receives the result and stores the result in the location. The translation logic employs a control ROM to decode the load-ALU-store macro instruction.

An advantage of the present invention is that only one micro instruction is required to implement a load-ALU-store operation.

Another object of the present invention is to provide a microprocessor that can execute a compare-and-jump operation much faster than has heretofore been provided.

In another aspect, it is a feature of the present invention to provide an apparatus in a microprocessor for executing a compare-and-jump operation. The apparatus has a jump combiner, execution logic, and store logic. The jump combiner detects an ALU micro instruction and a conditional jump micro instruction, indicates a condition test prescribed by the conditional jump micro instruction in a field of said ALU micro instruction, and deletes the conditional jump micro instruction. The execution logic is coupled to the jump combiner. The execution logic receives the ALU micro instruction and performs an ALU operation prescribed by the ALU micro instruction. The execution logic also generates a result of the ALU operation and updates a flags register to indicate a condition of the result. The store logic is coupled to the execution logic. The store logic receives the result and performs the condition test on the flags register as prescribed by the field. The compare-and-jump operation is prescribed by the ALU micro instruction and the conditional jump micro instruction. The ALU operation is a binary arithmetic operation, a decimal arithmetic operation, or a logic operation.

Another advantage of the present invention is that application programs having a significant number of compare-and-jump operations execute without undue program delays.

A further object of the invention is to provide an apparatus in a microprocessor that allows a single micro instruction that accomplishes all three tasks related to a load-ALU-store instruction: loading an operand from memory, performing an ALU operation using the operand, and storing a result of the operation.

In a further aspect, it is a feature of the present invention to provide an apparatus for executing a compare-and-jump macro instruction sequence directing a microprocessor to perform a compare function, to update a flags register with a status corresponding to a result, and to evaluate the flags register to determine if the status satisfies a prescribed condition. The apparatus includes an instruction decoder and a jump combiner. The instruction decoder receives the compare-and-jump macro instruction sequence and translates the macro instruction sequence into an ALU micro instruction and a conditional jump micro instruction. The jump combiner is coupled to the instruction decoder. The jump combiner combines the ALU micro instruction and the conditional jump micro instruction into a compare-and-jump micro instruction. The compare-and-jump micro instruction has an ALU micro operation field and a conditional jump field. The ALU micro operation field directs the microprocessor to perform the compare function and to update the flags register with the status. The conditional jump field directs the microprocessor to evaluate the flags register.

A further advantage of the present invention is that the number of instructions to implement a compare-and-jump operation actually decreases as they are processed by the microprocessor.

Yet another object of the present invention is to provide a method for combining a conditional jump instruction and an ALU instruction into a single compare-and-jump micro instruction.

In yet another aspect, it is a feature of the present invention to provide a method for performing a compare-and-branch operation in a pipeline microprocessor. The method includes detecting an ALU micro instruction and a conditional branch micro instruction prior to their execution, combining the ALU instruction and the conditional jump instruction into a compare-and-branch micro instruction, performing a compare operation prescribed by the compare-and-branch micro instruction to produce a result and a result status, and evaluating the result status in accordance with a condition prescribed by the compare-and-branch micro instruction. The detecting includes monitoring a micro instruction queue to identify the conditional branch micro instruction, and confirming that the conditional branch micro instruction immediately follows the ALU micro instruction in the micro instruction queue.

Yet another advantage of the present invention is that execution of a conditional branch operation can be combined with execution of a related ALU operation.

BRIEF DESCRIPTION OF THE DRAWINGS

These and other objects, features, and advantages of the present invention will become better understood with regard to the following description, and accompanying drawings where:

FIG. 3 is a table illustrating execution of a load-ALU-store instruction and instructions prescribing a compare-and-jump operation by the microprocessor of FIG. 2.

FIG. 6 is a table illustrating execution of a load-ALU-store instruction and instructions prescribing a compare-and-jump operation by the microprocessor of FIG. 5.

DETAILED DESCRIPTION

In light of the above background on techniques for performing load-ALU-store and compare-and-jump operations, several related art examples will now be discussed with reference to FIGS. 1 through 3. These examples illustrate how present day pipeline microprocessors do not efficiently execute these types of operations. The examples particularly point out that execution of a load-ALU-store operation results in the generation of three associated micro instructions and execution of a compare-and-jump operation results in the generation of four associated micro instructions, simply because the architecture of present day. microprocessors precludes a micro instruction from directing both a data access operation and an ALU operation. Following this discussion, a detailed description of the present invention will be provided with reference to FIGS. 4 through 7. Use of the present invention allows a single micro instruction to direct both a data access task and an ALU task, thus allowing both load-ALU-store and compare-and-jump operations to execute much faster than has heretofore been provided.

Figure 1:
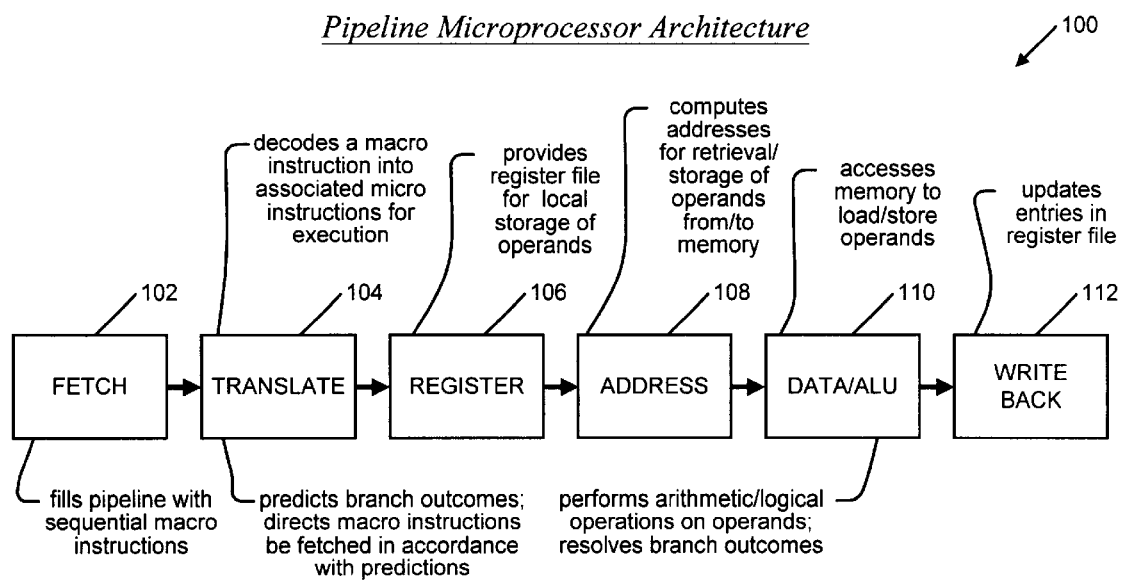
FIG. 1 is a block diagram illustrating pipeline stages of a related art pipeline microprocessor.

Referring to FIG. 1, a block diagram is presented of a present day related art pipeline microprocessor 100. The microprocessor 100 includes a fetch stage 102, translate stage 104, register stage 106, address stage 108, data/ALU stage 110, and write back stage 112.

Operationally, the fetch stage 102 fetches instructions from memory (not shown) that are to be executed by the microprocessor 100. The translate stage 104 translates, or decodes, the fetched instructions into associated micro instructions, each micro instruction directing the microprocessor 100 to perform a specific subtask related to accomplishment of an operation prescribed by a fetched macro instruction. The register stage 106 retrieves operands specified by the micro instructions from a register file (not shown) for use by later stages in the pipeline. The address stage 108 calculates memory addresses specified by the micro instructions to be used in data storage and retrieval operations. The data/ALU stage 110 either performs arithmetic logic unit (ALU) operations on data retrieved from the register file, or reads data from memory using the memory address calculated in the address stage 108, or writes data to memory using the memory address calculated in the address stage 108. The write back stage 112 writes the result of a data read operation, or an ALU operation, to the register file. Thus, macro instructions are fetched by the fetch stage 102, they are decoded into micro instructions by the translate stage 104, and the micro instructions proceed through subsequent stages 106-112 for execution.

Micro instructions move through successive stages of the microprocessor pipeline in synchronization with a microprocessor clock. Optimally, while any given stage in the pipeline is executing a micro instruction, the previous stage should be executing the next micro instruction. If a stage in the pipeline requires more than one cycle of the pipeline clock to execute a given micro instruction, flow of micro instructions through the microprocessor pipeline is momentarily stalled: preceding stages in the pipeline are precluded from forwarding associated results down the pipeline and succeeding stages, having completed execution of a current micro instruction, sit idle. A stall in the pipeline is referred to as a slip or a void. Slips cause delays when application programs execute on the microprocessor 100.

In general, the speed at which a particular application program executes on the microprocessor 100 is significantly influenced by the number of pipeline slips that are. encountered. For this reason, present day microprocessors employ numerous techniques to minimize the number of pipeline voids and to efficiently execute application programs. Efficient execution and slip minimization are two significant design criteria that have contributed to the manner in which functions of the microprocessor 100 have been allocated to its constituent pipeline stages 102–112. These two design criteria have been balanced against other significant factors such as design complexity and cost to yield the 6-stage pipeline architecture presented in FIG. 1.

The discussion herein focuses on problems created by functional limitations of the data/ALU stage 110, particularly with respect to execution of instructions that direct the microprocessor 100 to perform an ALU operation on an operand that must first be retrieved from memory and/or whose result must be returned to memory. Such instructions are referred to as load-ALU instructions, ALU-store instructions, or load-ALU-store instructions. Recall that logic in the data/ALU stage 110 allows either the performance of an ALU operation or a memory access operation, but not both. Consequently, to execute a load-ALU-store operation on a present day microprocessor 100, three separate micro instructions must be generated by translate stage logic 104: a load micro instruction to load the operand, an ALU micro instruction to execute the ALU operation using the operand, and a store micro instruction to store the result of the ALU operation.

Figure 2:
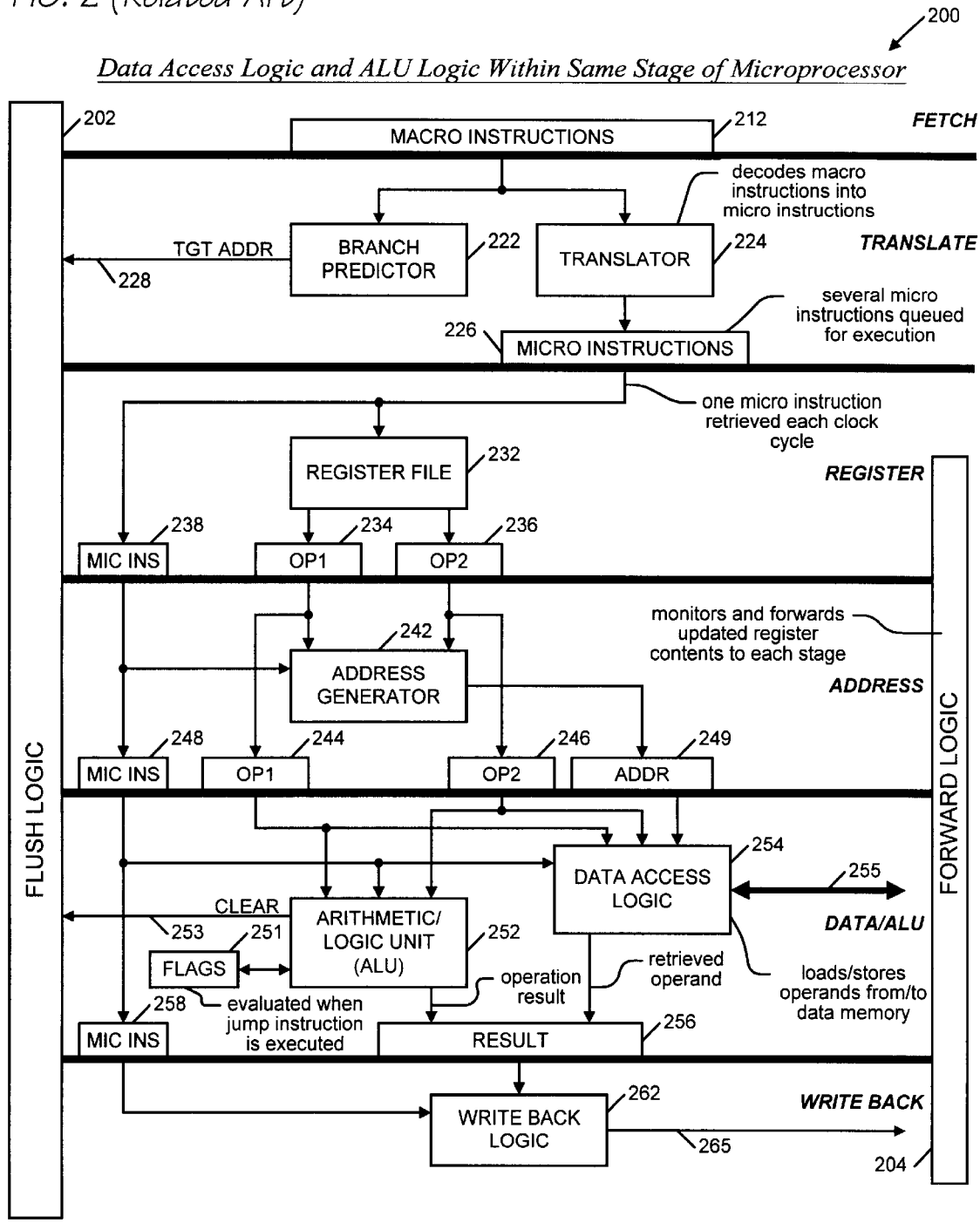
FIG. 2 is a block diagram of a related art pipeline microprocessor illustrating conventional apparatus for executing an instruction that both accesses memory and performs an ALU operation.

Now referring to FIG. 2, a block diagram of a related art pipeline microprocessor 200 is presented illustrating conventional apparatus for executing a macro instruction directing the microprocessor 200 to both access memory and perform an ALU operation. The microprocessor 200 includes logic corresponding to the six pipeline stages 102–112 described with reference to FIG. 1: fetch stage logic, translate stage logic, register stage logic, address stage logic, data/ALU stage logic, and write back logic. In addition, the microprocessor 200 has flush logic 202 and forward logic 204, each of which spans multiple stages of the microprocessor 200.

The fetch stage logic includes a macro instruction buffer 212 that provides macro instructions to the translate stage logic during each clock cycle. The translate stage logic has an instruction decoder 224, or translator 224, and a branch predictor 222, both of which receive macro instructions provided by the instruction buffer 212. The translator 224 provides an output to a micro instruction queue 226. The branch predictor 222 provides an output 228 to the flush logic 202. The register stage logic includes a register file 232 that provides outputs to a first operand register 234 and a second operand register 236. Additionally, the register stage logic routes micro instructions to the next stage via buffer 238. The address stage logic has an address generator 242 that provides an output to an address register 249. Also, the address stage logic routes micro instructions and operands to the data/ALU stage via buffers 248, 244, and 246. The data/ALU stage logic has an ALU 252 that provides an output to a result register 256 and a clear signal 253 to the flush logic 202. The data/ALU stage logic also has data access logic 254 that interfaces to memory (not shown) via bus 255. Additionally, the data/ALU stage logic routes micro instructions to the write back stage via buffer 258. The write back stage includes write back logic 262 that provides an output via bus 265. The flush logic 202 spans multiple stages of the microprocessor pipeline, receiving a target address signal 228 from the branch predictor 222 and a clear signal 253 from the ALU 252. The forward logic 204, also referred to as bypass logic 204, spans the pipeline stages following the translate stage.

Operationally, macro instructions are retrieved from an instruction cache (not shown) and are buffered in order for translation in the macro instruction buffer 212. In synchronization with a pipeline clock signal (not shown), macro instructions are retrieved from the buffer 212 and provided to the translator 224. The translator 224 decodes each macro instruction into a corresponding sequence of micro instructions, which are then queued in the micro instruction queue 226 for execution by subsequent stages. In parallel with translation, the branch predictor 222 monitors each macro instruction that is retrieved from the macro instruction buffer 212 to determine if it is a conditional branch instruction. Conditional branch instructions are also known as conditional jump instructions.

A conditional jump instruction directs the microprocessor 200 to perform a prescribed test on the status of bits, or flags, within a flags register 251. If the test prescribed by the conditional jump instruction is satisfied, then sequential instruction execution is interrupted and program control is directed to another location in memory. This location is commonly called a branch target address, or target address.

Branch prediction is a technique used by most present day microprocessors 200 to reduce the number of pipeline stalls related to the execution of conditional jump instructions. Briefly, when a conditional jump micro instruction executes, the prescribed test is performed on the flags register 251 by the ALU 252. If the prescribed test is satisfied, then the ALU 252 provides a clear signal 253 to the flush logic 202 directing the microprocessor 200 to flush the pipeline stages preceding the data/ALU stage and to refill the pipeline with instructions beginning at the target address. If the prescribed test is not satisfied when the ALU 252 evaluates the flags register 251, then sequential instruction execution is allowed to continue. In other words, the jump micro instruction simply falls through the data/ALU stage. Performance of the prescribed test, i.e., execution of the conditional branch instruction by data/ALU stage logic, is known as resolving the branch. Definitively evaluating the status of the flags register 251 resolves the conditional jump micro instruction.

Branches are referred to as resolved once the flags register 251 has been evaluated because the branch predictor 222 in a present day microprocessor 200 speculatively executes branches prior to their resolution. Based upon historical and deterministic data related to a particular conditional jump instruction, the branch predictor 222 predicts what the outcome of the conditional jump instruction will be while it is being translated by the instruction decoder 224. If the branch predictor 222 predicts that the conditional jump will fall through, i.e., the jump will not be taken, then sequential instruction translation is allowed to continue. If the branch predictor 222 predicts that the jump will be taken, then the branch predictor 222 provides a target address 228 to the flush logic 202 so that the fetch stage logic can begin fetching instructions beginning at the target address in memory.

Branch prediction schemes save a great number of pipeline cycles that would be otherwise consumed by slips waiting for target instructions to load. Thus, rather than waiting for a conditional jump instruction to resolve, its outcome is predicted in the translate stage and instructions are henceforth fetched according to the predicted outcome provided by the branch predictor 222. Yet, although branch prediction schemes are very effective in predicting the outcome of conditional jump instructions, they are not totally accurate. Because of this each conditional branch instruction must still be resolved in order to confirm or contradict a corresponding outcome prediction. One skilled in the art will appreciate that there are many different techniques that are used in present day microprocessors 200 to effect branch prediction. A detailed discussion of branch prediction techniques is beyond the scope of this application. It is sufficient to note that, regardless of the specific branch prediction technique employed by a microprocessor 200, each conditional jump instruction that is executed must be resolved by actually performing the prescribed test on the flags register 251.

Continuing with register stage logic, a micro instruction is provided to the register file 232 during each pipeline clock cycle from the micro instruction queue 226. The register file 232 provides temporary storage for operands. These operands may be used directly in a computation by later stages of the microprocessor 200 to compute a result or an address, or they may be results or computations that are pending a write to memory. A micro opcode field in a micro instruction directs the register file logic to retrieve up to two operands from prescribed locations in the register file 232. If the micro opcode so directs, these two operands are provided in the first and second operand registers 234, 236. In addition, the micro instruction itself is piped down to the address stage logic via buffer 238.

If the micro instruction directs the microprocessor 200 to read (i.e., load) or write (i.e., store) an operand from/to memory, then the address generator 242 uses address components provided by the micro instruction and the first and second operand registers 234, 236 to compute an address, or location, of the operand in memory. The address is provided to address register 249. If the micro instruction does not direct a load or a store, then the contents of buffers 234, 236 are piped down to the data/ALU stage via buffers 244, 246. In addition, the micro instruction is provided to the data/ALU stage logic via buffer 248.

In the data/ALU stage, if the micro instruction retrieved from buffer 248 directs the microprocessor 200 to perform a load or a store operation, then the address computed in the previous stage is retrieved from the address register 249 and is provided to the data access logic 254. The micro opcode field of the micro instruction directs the data access logic 254 to either load an operand from the location in memory (not shown) or to store one of the two operands provided in buffers 244, 246 to the location in memory. The memory, or data cache, is accessed via bus 255.. An operand that is loaded from memory is provided to the result register 256. If, however, the micro instruction directs that an ALU operation be performed, then the two operands are provided to the ALU 252. The ALU 252 performs the operation using the contents of buffers 244, 246 and generates a result of the operation in the result register 256. And for every result that is generated, the ALU 252 updates the flags register 251 to indicate the condition, or status, of the result. In an x86-compatible microprocessor 200, flags in the flags register 251 include a zero flag, indicating that the result is zero; a carry flag, indicating that the ALU operation generated a carry or a borrow out of the most significant bit of the result; a parity flag, indicating that the least significant byte of the result contains an even number of logical 1 bits; a sign flag, indicating the state of the most significant bit of the result; and an overflow flag, indicating that the result will not fit in a prescribed destination register. If the micro instruction is a conditional jump instruction, then, as discussed above, the ALU 252 simply checks the status of the flags register 251 to determine if prescribed flags are indicated. If the prescribed flags are indicated and the branch predictor 222 has allowed sequential instructions to fall through, then the ALU 252 asserts the clear signal 253, thus directing the microprocessor 200 to flush the pipeline. The clear signal 253 is also asserted in the case where the branch predictor 222 has speculatively taken a branch to a target address and the prescribed flags are not indicated within the flags register 251. The micro instruction is also provided to the write back stage via buffer 258.

Although a conditional jump micro instruction may be executed at any time, it is common to find that the conditional jump micro instruction directly follows a corresponding micro instruction that directs an ALU operation such as a binary arithmetic operation, a decimal arithmetic operation, or a logic operation. When this case occurs, it is referred to as a compare-and-jump operation. The compare portion of the operation is prescribed by the ALU micro instruction, and the jump portion of the operation is prescribed by the conditional jump instruction.

The write back logic 262 retrieves the result from the result register 256 and, if so directed by the micro instruction obtained from buffer 258, the write back logic 262 writes the result to a destination register in the register file 232.

The forward logic 204 is used to forward an operand that has been generated by one of the stages to other stages that require the operand, without having to insert slips into the pipeline so that the operand can first be written back to its destination register. For example, a first micro instruction may direct the microprocessor 200 to load an operand from memory and a following micro instruction directs the microprocessor 200 to perform an ALU operation using the loaded operand. Rather than inserting slips into the pipeline so that the operand can be written into a temporary register in the register file 232 by the first micro instruction, then retrieved by the second micro instruction, the forward logic 204 simply forwards the operand to the second micro instruction as it proceeds into the data/ALU stage.

It is important to understand that data/ALU stage logic in a present day microprocessor 200 only allows a micro instruction to perform a data access operation or an ALU operation, but not both. In addition, a prescribed data access operation can be either a load or a store, but not both a load and a store. Consequently, a macro instruction that prescribes one of the operations alluded to above, i.e., load-ALU, ALU-store, and load-ALU-store, must be decoded into more than one micro instruction in order to execute to completion in accordance with to the limitations imposed by data/ALU stage architecture. Translation and execution of a load-ALU-store macro instruction is more specifically described with reference to FIG. 3.

Now referring to FIG. 3, a table 300 is presented illustrating execution through completion of a load-ALU-store instruction followed by execution of instructions prescribing a compare-and-jump operation by the microprocessor 200 of FIG. 2. An x86-compatible load-ALU-store macro instruction, ADD [BX],AX, is shown in the Fetch column of the table 300. The load-ALU-store macro instruction, directs the microprocessor 200 to load an operand from a location in memory prescribed by the contents of register BX in the register file 232, to add the contents of register AX in the register file 232 to the retrieved operand, and to store the result of the addition in the prescribed location in memory. The compare-and-jump operation is specified in the Fetch column by two x86-compatible micro instructions: ADD [BX],AX and Jcc TGT. ADD [BX],AX directs the microprocessor 200 to perform a second load-ALU-store operation, as described above, and to immediately follow this operation with a conditional branch. Jcc designates any micro opcode that directs the microprocessor 200 to perform a prescribed test on the flags register 251 to evaluate the result of the second load-ALU-store operation. If the prescribed test is satisfied, then the microprocessor 200 is instructed to jump to a target address, designated by TGT. If the prescribed test is not satisfied, then sequential instruction execution is allowed to continue. One skilled in the art will appreciate that there are many different prescribed tests that may be performed on a flags register 251, to include combinations of flag states. For the purposes of this application, any of the combinations will suffice. Jcc represents any conditional branch instruction that is provided for the microprocessor 200. Execution of the instructions by the microprocessor 200 is described with reference to cycles of a pipeline clock. Instructions before and after instructions of interest are designated by "***" During cycle 1, the load-ALU-store instruction, ADD [BX],AX proceeds through the fetch stage of the microprocessor 200. It is placed in the macro instruction buffer 212 by fetch stage logic so that it can be decoded by translate stage logic during the next clock cycle.

During cycle 2, ADD [BX],AX proceeds through the translate stage of the microprocessor 200. Therein, the load-ALU-store macro instruction is decoded into a sequence of three micro instructions to accomplish the load-ALU-store operation: a first micro instruction, LD T1, [BX], directing the microprocessor 200 to retrieve the operand from the memory location and to load it in temporary register T1; a second micro instruction, ADD T1,AX, that directs the microprocessor 200 to add the contents of registers T1 and AX and to place the sum in register T1; and a third micro instruction, ST [BX],T1, that directs the microprocessor 200 to store the contents of register T1 to the memory location prescribed by the contents of register BX. As the micro instructions are generated by the instruction decoder 222, they are placed in the micro instruction queue 226. Depending upon the specific translation technique employed, generation of the three micro instructions may take more than one clock cycle. Also during cycle 2, a following macro instruction proceeds through the fetch stage.

During cycle 3, the first micro instruction, LD T1, [BX], proceeds through the register stage. Therein, contents of register BX are retrieved from the register file 232 and are provided to the first operand buffer 234. The contents of register BX are to be used as an address component for calculation of an address of the location in memory.

During cycle 4, the first micro instruction proceeds through the address stage. Therein, the contents of register BX are retrieved from the first operand buffer 234 and are provided to the address generator 242. The address generator 242 uses the contents of register BX to generate the address corresponding to the location in memory from which the operand will be retrieved. The address is provided to the address register 249. Also during cycle 4, the second micro instruction, ADD T1,AX proceeds through the register stage. Therein, the contents of registers T1 and AX are retrieved from the register file 232 and are provided in the first and second operand buffers 234, 236. One skilled in the art will observer that, during this cycle, register T1 does not contain the retrieved operand as it should in order for the second micro instruction to properly execute. In fact, the operand has yet to be retrieved from memory. Nevertheless, the forward bus 204 monitors such activity and will forward the operand corresponding to register T1 to the second micro instruction when it is required for a computation. One skilled in the art will also acknowledge that, in the absence of a forward bus 204, the microprocessor 200 would be required to insert slips into the pipeline at this point to allow the operand to be fetched from memory and written to register T1.

During cycle 5, the first micro instruction enters the data/ALU stage. Therein, because the micro opcode directs the microprocessor 200 to perform a load operation, the address is retrieved from the address register 249 and is provided to the data access logic 254. The data access logic 254 retrieves the operand from the prescribed address via bus 255 and places the operand in the result register 256. Also during cycle 5, the second micro instruction proceeds through the address stage. Since the second micro instruction does not prescribe a memory access operation, the contents of registers T1 and AX are simply forwarded to buffers 244 and 246 and the second micro instruction is forwarded to buffer 248. In addition, the forward bus 204 detects that the operand is destined for register T1. Thus, the forward bus 204 forwards the operand to buffer 244 so that it can be used by the second micro instruction. Also during cycle 5, the third micro instruction corresponding to the load-ALU-store operation, ST [BX],T1, proceeds through the register stage. Therein, contents of registers BX and T1 are retrieved from the register file 232 and are provided in the first and second operand buffers 234, 236. But although the contents of register 236 is not the expected result of the addition yet to be generated by the second micro instruction, the forward bus 204 again is employed to provide the result to this micro instruction when the result is generated.

During cycle 6, the first micro instruction proceeds through the write back stage. Therein, the operand is retrieved from the result register 256 and is written into its destination register in the register file 232, register T1. At this point, execution of the first micro instruction is complete. Also during cycle 6, the second micro instruction proceeds through the data/ALU stage. Because buffers 244 and 246 do indeed contain the data required for the addition operation, the ALU 252 retrieves the contents of buffers 244 and 246 and performs the addition. The result of the addition is provided to the result register 256. In addition, the ALU 252 updates the flags register 251 to reflect the status of the result of the addition operation. Also during cycle 6, the third micro instruction proceeds through the address stage. Since the third micro instruction prescribes a store operation, the contents of register BX are retrieved from buffer 234 and are used by the address generator 242 to generate an address for the location in memory. In addition, the forward bus 204 detects that the result of the addition is destined for register T1. Accordingly, the forward bus 204 forwards this result to buffer 246 so that the data/ALU logic can store the proper result during the next clock cycle.

During cycle 7, the second micro instruction proceeds through the write back stage. Therein, the result of the addition is retrieved from the result register 256 by write back logic 262 and is written to register T1 in the register file 232 via bus 265. At this point, execution of the second micro instruction is complete. Also during cycle 7, the third micro instruction proceeds through the data/ALU stage. Because the third micro instruction specifies a store operation, the data access logic 254 retrieves the generated address from the address register 249 and stores the result contained in buffer 246 to the prescribed memory location.

During cycle 8, the third micro instruction proceeds through the write back stage. It does not direct the microprocessor 200 to write back operands to the register file 232, so at this point, execution of the third micro instruction is complete. In addition, because all three micro instructions have completed execution, execution of the load-ALU-store operation is complete. Note that three cycles of the pipeline clock are required to execute the three micro instructions corresponding to the load-ALU-store operation.

During cycle 11, the second load-ALU-store instruction, ADD [BX],AX proceeds through the fetch stage of the microprocessor 200. Furthermore, the second load-ALU-store instruction is immediately followed by the conditional jump instruction, thus prescribing a compare-and-jump operation. The second load instruction is provided as described above to the macro instruction buffer 212 for translation during the following clock cycle.

Operation of the second load-ALU-store instruction with reference to cycles 11 through 18 is identical to operation of the load-ALU-store instruction described above with reference to clock cycles 1 through 8. And although the second load-ALU-store instruction and the conditional jump instruction are related, for execution purposes, a present day microprocessor 200 treats the conditional jump instruction independently. Hence, during cycle 12, the conditional jump instruction is provided to the micro instruction buffer 212 for translation during the next clock cycle. Also during cycle 12, a following macro instruction proceeds through the fetch stage.

During cycle 13, the conditional jump macro instruction proceeds through the translate stage. Therein, two tasks are performed in parallel. First, the conditional jump macro instruction is decoded by the translator 224 into a conditional jump macro instruction, Jcc TGT. The conditional jump micro instruction is placed into the micro instruction queue 226 following the third micro instruction, ST [BX], T1, in the micro instruction sequence corresponding to the second load-ALU-store macro instruction. Second, the branch predictor 222 predicts the outcome of the conditional jump macro instruction and instructs the microprocessor 200 to fetch instructions in accordance with the prediction. For purposes herein, the predicted outcome is immaterial; it is sufficient to recall that, whatever the predicted outcome, the prescribed test must be performed on the flags register 251 to resolve the branch following generation of a result by the second micro instruction, ADD [BX],AX.

During cycles 14 and 15, the first, second, and third micro instructions corresponding to the second load-ALU-store macro instruction continue to execute as described above.

During cycle 16, the second micro instruction is executed by data/ALU stage logic, the result is generated, and the flags register 251 is updated by the ALU 252 to reflect the status of the result. Also during cycle 16, the conditional jump micro instruction proceeds through the register stage. The particular conditional jump micro instruction used in this example provides an immediate target address, TGT, as part of the micro instruction itself. Therefore, during this cycle, the conditional jump micro instruction is simply forwarded to buffer 238. One skilled in the art will acknowledge that a target address can be prescribed otherwise, such as via address components that are contained in registers. The method of target address specification is immaterial to this discussion. Any of the methods can be used.

During cycle 17, the conditional jump micro instruction proceeds through the address stage. Since no address is to be derived, the conditional jump micro instruction is piped down to the next stage via buffer 248.

During cycle 18, the conditional jump micro instruction proceeds through the data/ALU stage. The ALU 252 retrieves the conditional jump micro instruction from buffer 248 and performs the prescribed test on flags in the flags register 251 to check the status of the previously generated result. If the condition of the flags confirm the previous branch prediction, then instruction execution is allowed to continue in accordance with the prediction. If the condition of the flags contradicts the prediction, then the ALU 252 would assert the clear signal 253 directing the flush logic 202 to flush the pipeline. The table 300 reflects that the flags confirm the previous predicted outcome.

During cycle 19, the conditional jump micro instruction proceeds through the write back stage. Accordingly, execution of the conditional jump micro instruction is completed, and hence, execution of the compare-and-jump operation is completed.

Note three points about the compare-and-jump scenario presented with reference to cycles 11 through 19. First, although the second load-ALU-store macro instruction and the conditional jump macro instruction are related (i.e., the conditional jump macro instruction is specified to check the status of the result of the load-ALU-store operation), they are executed independently by the microprocessor. Second, four micro instructions are required to execute the compare-and-jump operation: three for the load-ALU-store part and one for the conditional jump part. Third, execution of the conditional jump micro instruction essentially only involves confirming or contradicting a previously predicted branch outcome. In fact, all the conditional jump micro instruction direct the microprocessor 200 to do is to take action based upon contents of the flags register 251.

Both the load-ALU-store and the compare-and-jump scenarios described with reference to FIG. 3 are commonly employed in present day desktop application programs. And they cause unwarranted delays. This is primarily because data/ALU stage logic in a present day microprocessor 200 limits the functions that can be performed by a single micro instruction. The micro instruction cannot perform a load operation followed by an ALU operation, or an ALU operation followed by a store operation, or most restrictively, a load operation followed by an ALU operation followed by a store operation. Furthermore, a present day microprocessor 200 treats conditional jumps independent of their associated ALU instructions, thus adding yet another micro instruction to an already crowded pipeline. One skilled in the art will appreciate that a reduction in the number of micro instructions that are required to perform a prescribed operation will markedly improve the performance of an application that frequently prescribes the operation.

The present invention overcomes the limitations imposed by current data/ALU stage logic by separating load logic, ALU logic, and store logic into three sequential stages in the microprocessor pipeline, thus providing the means for a single micro instruction to be employed to perform a load-ALU-store operation. Furthermore, the present invention provides the means to prescribe a compare-and-jump operation in a single micro instruction rather than four micro instructions. The present invention is described with reference to FIGS. 4 through 7.

Figure 4:
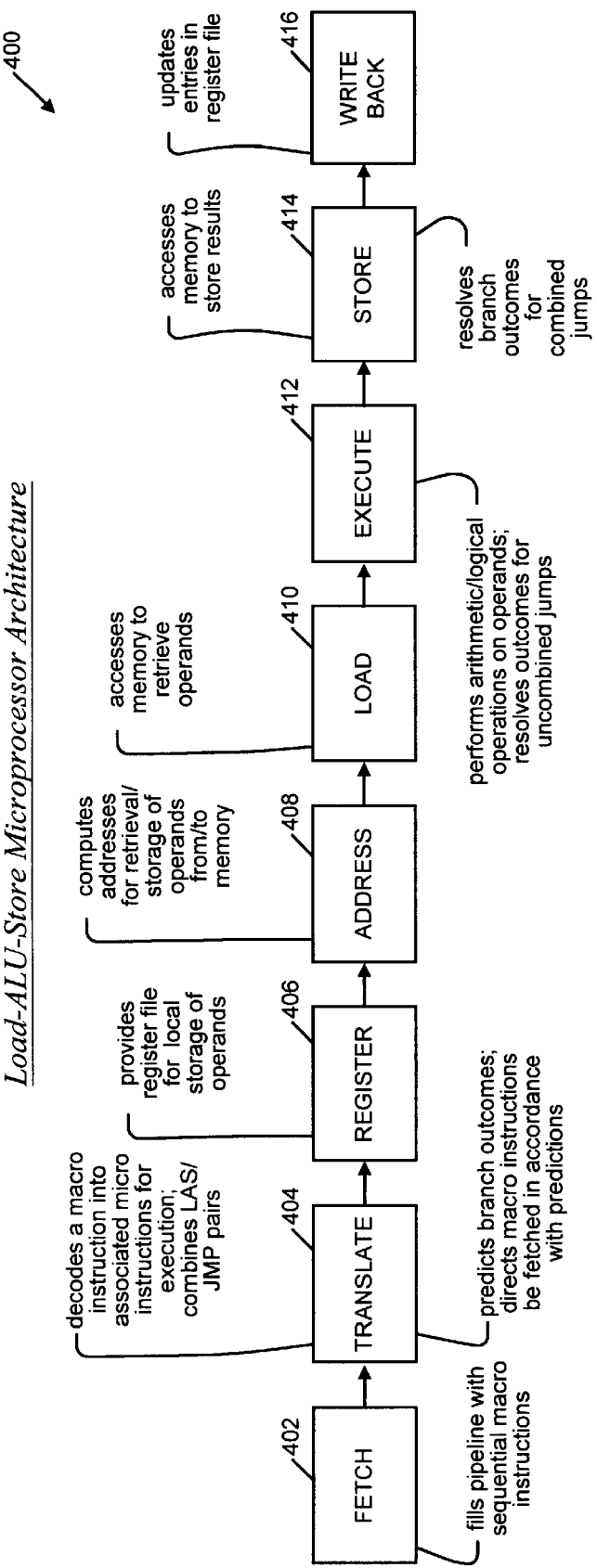
FIG. 4 is a block diagram illustrating pipeline stages of a microprocessor according to the present invention.

Referring to FIG. 4, a block diagram is presented illustrating pipeline stages of a microprocessor 400 according to the present invention. Like the microprocessor 100 described with reference to FIG. 1, the microprocessor 400 according to the present invention includes a fetch stage 402, translate stage 404, register stage 406, address stage 408, and write back stage 412. In contrast to a conventional microprocessor 100 however, the microprocessor 400 according to the present invention includes a load stage. 410, and execute stage 412, and a store stage 414, thus allowing a single micro instruction to specify combined load, ALU, and store operations.

Operationally, the fetch stage 102, translate stage 404, register stage 406, address stage 408, and write back stage 416 function at a high level similar to the conventional microprocessor 100 described with reference to FIG. 1. The load stage 410, however, accesses memory using an address provided by the address stage 408 to retrieve operands. The execute stage 412 performs ALU operations on data retrieved either from the register file (not shown) or from memory and provides a result output. The store stage 414 accesses memory to store operands or the result of an ALU operation.

The microprocessor 400 according to the present invention is provided to mitigate the delays incurred in a conventional microprocessor 100 when executing load-ALU-store instructions and compare-and-jump operations. Separate stages 410, 414, 412 are provided to load and store data, and to sequentially perform ALU operations on that data so that the number of required micro instructions, and hence, the number of associated pipeline cycles required for execution, are reduced.

Figure 5A:
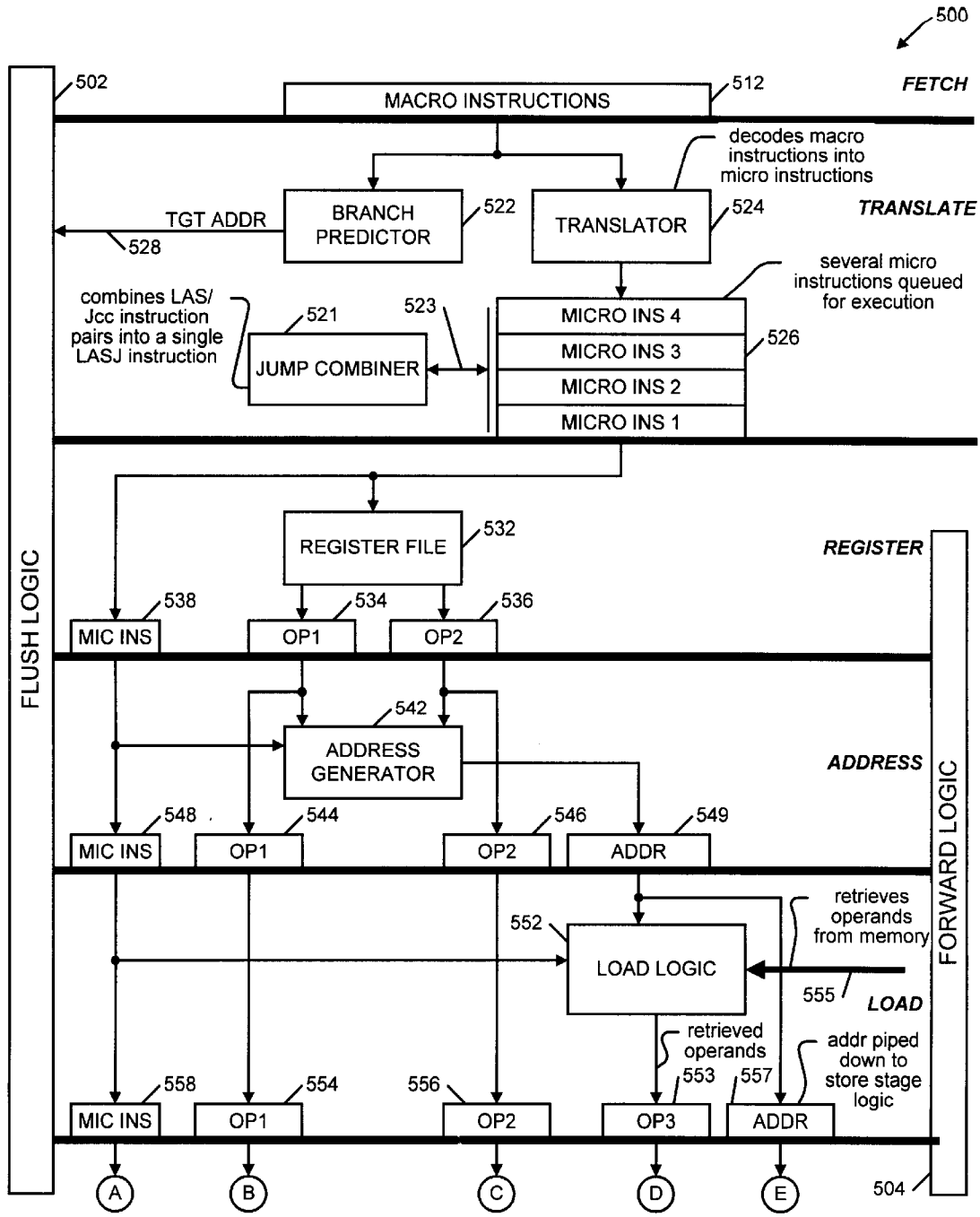
FIGS. 5A–B is a block diagram of the microprocessor according to the present invention featuring apparatus for executing an instruction that both accesses memory and performs an ALU operation.
Figure 5B:
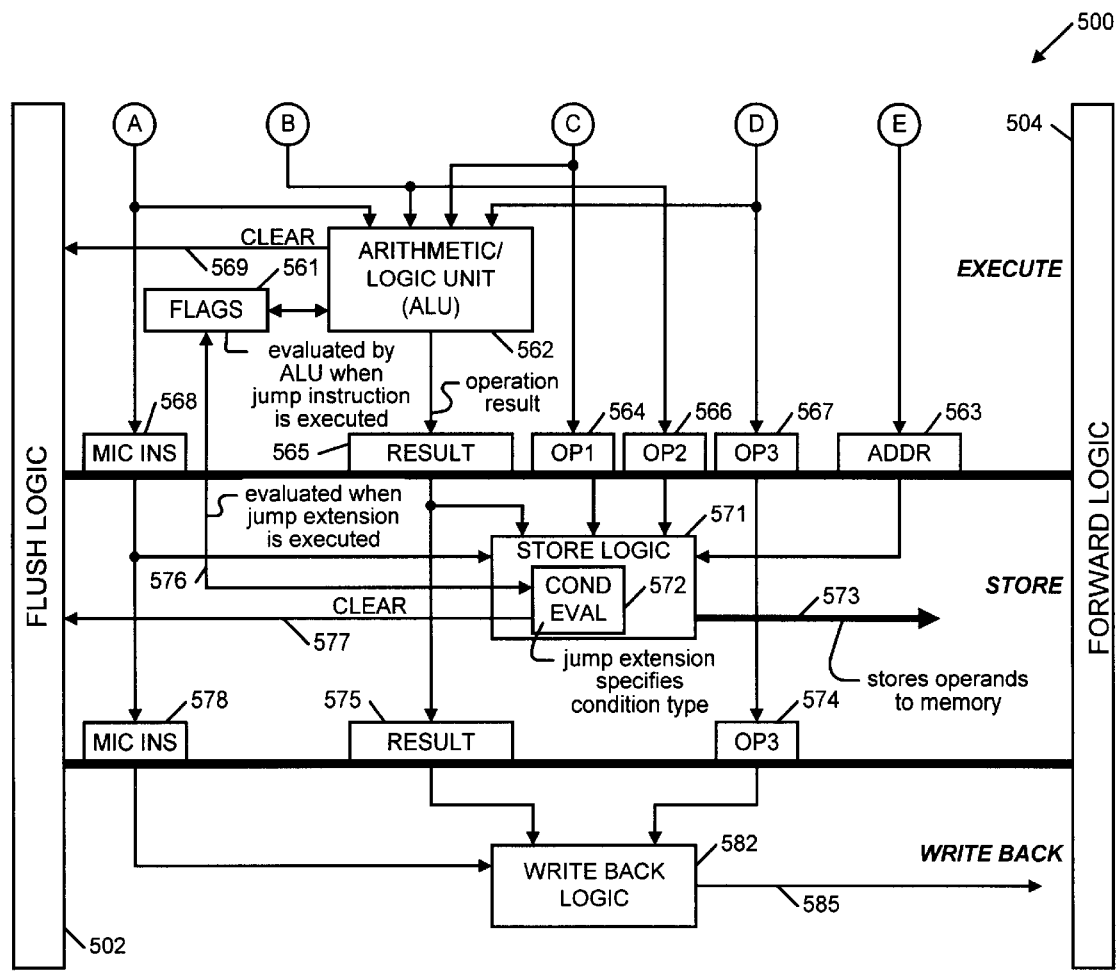

Now referring to FIG. 5, a block diagram is presented of the microprocessor 500 according to the present invention featuring apparatus for executing an instruction that both accesses memory and performs an ALU operation. The microprocessor 500 includes logic corresponding to the eight pipeline stages 402–416 described with reference to FIG. 4: fetch stage logic, translate stage logic, register stage logic, address stage logic, load stage logic, execute stage logic, store logic, and write back logic. In addition, the microprocessor 500 has flush logic 502 and forward logic 504, each of which spans multiple stages of the microprocessor 500.

The fetch stage logic includes a macro instruction buffer 512 that provides macro instructions to the translate stage logic during each clock cycle. The translate stage logic has an instruction decoder 524, or translator 524, and a branch predictor 522, both of which receive macro instructions provided by the instruction buffer 512. In one embodiment, the translator 524 is a control read-only memory (ROM). The translator 524 provides an output to a micro instruction queue 526. The branch predictor 522 provides an output 528 to the flush logic 502. In addition, the translate stage logic includes a jump combiner 521 that interfaces to the micro instruction queue 526 via bus 523. The register stage logic includes a register file 532 that provides outputs to a first operand register 534 and a second operand register 536. Additionally, the register stage logic routes micro instructions to the next stage via buffer 538. The address stage logic has an address generator 542 that provides an output to an address register 549. Also, the address stage logic routes micro instructions and operands to the load stage via buffers 548, 544, and 546. The load stage includes load logic 552 that interfaces to memory (not shown) via bus 555. The load logic provides an output to buffer 553. Additionally, the load stage routes micro instructions, operands, and addresses to the execute stage via buffers 558, 554, 556, and 557. The execute stage has an ALU 562 that provides an output to a result register 565 and a clear signal 569 to the flush logic 502. The ALU 562 is also coupled to a flags register 561. Additionally, the execute stage logic routes micro instructions, operands, and addresses to the store stage via buffers 568, 564, 566, 567, and 568. The store stage includes store logic 571 the interfaces to memory via bus 573. The store logic 571 is coupled to the flags register 561 via bus 576 and contains a condition evaluator 572. The store logic provides a clear signal 577 to the flush logic 502. In addition, the store stage pipes down micro instructions, results, and operands to the write back stage via buffers 578, 575, and 574. The write back stage includes write back logic 582 that provides an output via bus 585. The flush logic 502 spans multiple stages of the microprocessor pipeline, receiving the target address signal 528 from the branch predictor 522, the clear signal 569 from the ALU 562, and the clear signal 577 from the store logic 571. The forward logic 504 spans the pipeline stages following the translate stage.

Operationally, macro instructions are retrieved from an instruction cache (not shown) and are buffered in order for translation in the macro instruction buffer 512. The translator 524 decodes each macro instruction into a corresponding sequence of micro instructions, which are then queued in the micro instruction queue 526 for execution by subsequent stages. In parallel with translation, the branch predictor 522 monitors each macro instruction that is retrieved from the macro instruction buffer 512 to determine if it is a conditional jump instruction. If a conditional jump macro instruction is detected, then the branch predictor 522 predicts an outcome for the conditional jump macro instruction and directs the microprocessor 500 to fetch following macro instructions in accordance with the prediction. For speculative jumps, a target address is provided to the flush logic 502 via bus 528.

In contrast to conventional microprocessors, the microprocessor 500 according to the present invention has a jump combiner 521 within the translate stage. The jump combiner 521 monitors micro instructions that are placed by the translator 524 into the micro instruction queue 526. If the jump combiner 521 detects a conditional jump micro instruction in the micro instruction queue 526, then it examines the immediately preceding micro instruction to determine if it is an ALU micro instruction, that is, a micro instruction that directs the microprocessor 500 to perform an ALU operation that would result in an update to the flags register 561. The combination of an ALU micro instruction followed by a conditional jump micro instruction specifies a compare-and-jump operation. If a compare and jump operation is detected in the micro instruction buffer 526, then the jump combiner 521 evaluates the conditional jump micro instruction to determine the particular test, or condition, that is prescribed. The jump combiner 521 then indicates the particular test in a field of the preceding ALU micro instruction and removes the conditional jump micro instruction from the micro instruction queue 526. All following micro instructions are moved forward behind the modified ALU micro instruction. Recall that once a conditional jump micro instruction is placed into the micro instruction queue 526, the branch predictor 522 has already predicted its outcome and has directed the microprocessor 500 to begin (or continue) fetching instructions in accordance with the predicted outcome. All that remains to be done is to resolve the conditional jump micro instruction, a task that must take place following update of the flags register 561 to reflect the status of the result of the ALU operation that is prescribed by the ALU micro instruction. Thus, a compare-and-jump operation, normally prescribed be two macro instructions, can be executed with a single compare-and-jump micro instruction, a micro instruction prescribing an ALU operation and a subsequent test on the flags register 561.

Continuing with register stage logic, a micro instruction is provided to the register file 532 during each pipeline clock cycle from the micro instruction queue 526. Operands stored in the register file 532 may be used directly in a computation by later stages of the microprocessor 500 or they may be results or computations that are pending a write to memory. A micro opcode field in a micro instruction directs the register stage logic to retrieve up to two operands from prescribed locations in the register file 532. If the micro opcode so directs, these two operands are provided in the first and second operand registers 534, 536. In addition, the micro instruction itself is piped down to the address stage logic via buffer 538.

If the micro instruction directs the microprocessor 500 to read or write an operand from/to memory, then the address generator 542 uses address components provided by the micro instruction and the first and second operand registers 534, 536 to compute an address of a location in memory. The address is provided to address register 549. If the micro instruction does not direct a load or a store, then the contents of buffers 534, 536 are piped down to the load stage via buffers 544, 246. In addition, the micro instruction is provided to the load stage via buffer 548.

In the load stage, if the micro instruction retrieved from buffer 548 directs the microprocessor 500 to perform a load operation, then the address computed in the previous stage is retrieved from the address register 549 and is provided to the load logic 552. The micro opcode field of the micro instruction directs the load logic 554 to load an operand from the location in memory. The memory is accessed via 555. An operand that is loaded from memory is provided to register 553. In addition, micro instructions, operands, and the address are piped down to the execute stage via buffers 558, 554, 556, and 557.

In the execute stage, if the micro instruction directs that an ALU operation be performed, then the three operands are made available to the ALU 562. The ALU 562 performs the operation using the contents of buffers 554, 556, and 553, as prescribed by the micro instruction. The ALU 562 generates a result of the operation in the result register 565. In addition, the ALU 562 updates the flags register 561 to indicate the condition, or status, of the result. If the micro instruction is a conditional jump instruction, then, as discussed above, the ALU 562 simply checks the status of the flags register 561 to determine if prescribed flags are indicated. If the prescribed flags are indicated and the branch predictor 522 has allowed sequential instructions to fall through, then the ALU 562 asserts the clear signal 569, thus directing the microprocessor 500 to flush the pipeline. The clear signal 569 is also asserted in the case where the branch predictor 522 has speculatively taken a branch to a target address and the prescribed flags are not indicated within the flags register 561. Recall that a conditional jump micro instruction is combined into a preceding ALU micro instruction only if the ALU micro instruction immediately precedes the conditional jump micro instruction in the micro instruction queue 526. Thus, the case just described reflects resolution of a conditional jump micro instruction that has not been folded into a preceding ALU micro instruction. In addition, micro instructions, operands, and computed addresses are piped down to the store stage in buffers 568, 564, 566, 567, and 563.

The store logic 571 retrieves the result register 565, the two operand buffers 564, 566, and the address register 563. If the micro instruction provided via buffer 568 so directs, then the store logic writes either the result or one of the prescribed operands to memory at the address contained in buffer 563. The memory is accessed via bus 573. The condition evaluation logic 572 in the store logic 571 is specifically provided to execute prescribed tests of the flags register 561 as indicated in a compare-and-jump micro instruction that was generated by the jump combiner 521. Because the ALU operation corresponding to a compare-and-jump micro instruction is executed in the execute stage along with update of the flags register 561, resolution of the conditional jump portion of a combined compare-and-jump micro instruction is be performed by the condition evaluator 572 via bus 576, in parallel with any other write activity to memory that may be so directed. If the status of the flags register 561 contradicts the prediction made by the branch predictor, then the store logic 571 asserts the clear signal 577, thus directing the flush logic 502 to flush the microprocessor pipeline. Otherwise, instruction execution is not interrupted. In addition to data storage and resolution of combined compare-and-jump micro instructions, the store stage pipes down micro instructions, the contents of the result register 565 and operands in buffers 578, 575, and 574.

The write back logic 582 retrieves the result and operand from buffer 575 and 574 and, if so directed by the micro instruction obtained from buffer 278, the write back logic 582 performs a write to a destination register in the register file 532.

As in a conventional microprocessor, the forward logic 504 is used to forward an operand that has been generated by one of the stages to other stages that require the operand, without having to insert slips into the pipeline so that the operand can first be written back to its destination register.

In contrast with a conventional microprocessor, the architecture of the microprocessor 500 according to the present invention allows a single micro instruction to prescribe a load-ALU operation, an ALU-store operation, a load-ALU-store operation, and furthermore, a load-ALU-store-jump operation. Consequently, a macro instruction that prescribes a load-ALU, ALU-store, or load-ALU-store is decoded into only one micro instruction. Moreover, the two macro instructions that specify a compare-and-jump operation, an ALU instruction immediately followed by a conditional jump instruction, are translated into two corresponding micro instructions by the translator 524, then are subsequently combined by the jump combiner 521 into a single compare-and-jump micro instruction. Translation and execution of a load-ALU-store macro instruction and instructions specifying a compare-and-jump operation are more specifically described with reference to FIG. 6.

Referring to FIG. 6, a table 600 is presented illustrating execution through completion of a load-ALU-store instruction followed by execution of instructions prescribing a compare-and-jump operation by the microprocessor 500 of FIG. 5. An x86-compatible load-ALU-store macro instruction, ADD [BX],AX, is shown in the Fetch column of the table 600. The load-ALU-store macro instruction, directs the microprocessor 500 to load an operand from a location in memory prescribed by the contents of register BX in the register file 532, to add the contents of register AX in the register file 532 to the retrieved operand, and to store the result of the addition in the prescribed location in memory. The compare-and-jump operation is specified in the Fetch column by two x86-compatible micro instructions: ADD [BX],AX and Jcc TGT. ADD [BX],AX directs the microprocessor 500 to perform a second load-ALU-store operation, as described above, and to immediately follow this operation with a conditional branch. Jcc designates any micro opcode that directs the microprocessor 500 to perform a prescribed test on the flags register 561 to evaluate the result of the second load-ALU-store operation. If the prescribed test is satisfied, then the microprocessor 500 is instructed to jump to a target address, designated by TGT. If the prescribed test is not satisfied, then sequential instruction execution is allowed to continue. Execution of the instructions is described with reference to cycles of a pipeline clock. Instructions before and after instructions of interest are designated by "***".

During cycle 1, the load-ALU-store instruction, ADD [BX],AX proceeds through the fetch stage of the microprocessor 500. It is placed in the macro instruction buffer 512 by fetch stage logic so that it can be decoded by translate stage logic during the next clock cycle.

During cycle 2, ADD [BX],AX proceeds through the translate stage. Therein, the load-ALU-store macro instruction is decoded into a single load-ALU-store micro instruction, designated by LAS [BX],AX, directing the microprocessor 500 to retrieve the operand from the memory location, to add the retrieved operand to the contents of register AX, and to store the resultant sum in the memory location prescribed by the contents of register BX. The load-ALU-store micro instruction is placed in the micro instruction queue 526. Also during cycle 2, a following macro instruction proceeds through the fetch stage.

During cycle 3, the load-ALU-store micro instruction, proceeds through the register stage. Therein, contents of registers BX and AX are retrieved from the register file 532 and are provided to the first operand and second operand buffers 534, 536. The contents of register BX are to be used as an address component for calculation of an address of the location in memory.

During cycle 4, the load-ALU-store micro instruction proceeds through the address stage. Therein, the contents of register BX are retrieved from the first operand buffer 534 and are provided to the address generator 542. The address generator 542 uses the contents of register BX to generate the address corresponding to the location in memory from which the operand will be retrieved. The address is provided to the address register 549. In addition during cycle 4, contents of register AX are piped down to the next stage via buffer 546.

During cycle 5, the load-ALU-store micro instruction enters the load stage. Therein, because the micro opcode directs the microprocessor 500 to perform a load operation, the address is retrieved from the address register 549 and is provided to the load logic 552. The load logic 552 retrieves the operand from the prescribed address via bus 555 and places the operand in operand buffer 553. Also during cycle 5, the contents of register AX are forwarded to buffer 556, the address of the memory location is forwarded to buffer 557, and the load-ALU-store micro instruction is forwarded to buffer 558.

During cycle 6, the load-ALU-store micro instruction proceeds through the execute stage. Therein, the operand is retrieved from buffer 553 and is provided to the ALU 562 along with the contents of register AX via buffer 556. The addition is performed and a result is provided to the result register 565. Also, the ALU 562 updates the flags register 561 to reflect the status of the result. In addition, the address and the load-ALU-store micro instruction are piped down to the store stage via buffers 563 and 568.

During cycle 7, the load-ALU-store micro instruction proceeds through the store stage. Therein, the result of the addition is retrieved from the result register 565 by store logic 571. In addition, the address is provided to the store logic via buffer 563. Because the load-ALU-store micro instruction so directs, the store logic 571 writes the result of the addition to the address in memory via bus 573.

During cycle 8, the load-ALU-store micro instruction proceeds through the write back stage. It does not direct the microprocessor 500 to write back operands to the register file 532, so at this point, execution of the load-ALU-store micro instruction is complete. Note that only one cycle of the pipeline clock is required to execute the load-ALU-store operation.

During cycle 11, the second load-ALU-store instruction, ADD [BX],AX proceeds through the fetch stage of the microprocessor 500. Furthermore, the second load-ALU-store instruction is immediately followed by the conditional jump instruction, thus prescribing a compare-and-jump operation. The second load instruction is provided as described above to the macro instruction buffer 512 for translation during the following clock cycle.

During cycle 12, the second load-ALU-store instruction proceeds through the translate stage. Therein, it is translated into a load-ALU-store micro instruction, LAS [BX],AX, as described above. The load-ALU-store micro instruction is placed into the micro instruction queue 526. Also during cycle 12, the conditional jump instruction proceeds through the fetch stage and is placed into the macro instruction buffer 512.

During cycle 13, the conditional jump instruction proceeds through the translate stage. It is decoded into a conditional jump micro instruction and is placed in the micro instruction queue 526 along with the load-ALU-store micro instruction. In parallel, the branch predictor 522 predicts the outcome of the conditional jump instruction and directs that instructions henceforth be fetched in accordance with the branch prediction. One skilled in the art will notice that during cycle 13, the load-ALU-store micro instruction is not forwarded to the register stage. Such a case occurs any time slips are incurred in the pipeline due to the execution of preceding micro instructions. In fact, for a conditional jump micro instruction to be combined with a preceding ALU instruction, they both must be present in the micro instruction queue 526 during the same clock cycle. Because this is the case shown in the table 300, the jump combiner 521 determines the prescribed test specified by the conditional jump micro instruction, indicates the prescribed test in a field of the load-ALU-store micro instruction, and removes the conditional jump micro instruction from the micro instruction queue 526. Hence, a load-ALU-store-jump micro instruction is formed in the micro instruction queue, designated by LASJ [BX],AX. The "J" suffix directs logic in the store stage of the microprocessor 500 to perform the prescribed test on the flags register 561.

Operation of the second load-ALU-store-jump micro instruction with reference to cycles 14 through 17 is identical to operation of the load-ALU-store instruction described above with reference to clock cycles 3 through 6. Hence, during cycle 17, the ALU operation is executed by the ALU 562, the result is generated, and the flags register 561 is updated to reflect the status of the result.

During cycle 18, the load-ALU-store-jump micro instruction proceeds through the store stage. In parallel with storage of the result to the memory location, the condition evaluation logic 572 performs the prescribed test on the flags register 561 via bus 576 to resolve the predicted branch.

During cycle 19, the load-ALU-store-jump micro instruction proceeds through the write back stage wherein execution of the compare-and-jump operation is completed. Execution of a compare-and-jump operation by the microprocessor 500 according to the present invention requires only one cycle of the pipeline clock as opposed to four cycles when compared to a conventional microprocessor. Application programs that exhibit a significant number of load-ALU-store and compare-and-jump operations run faster on the microprocessor 500 described herein.

Figure 7:
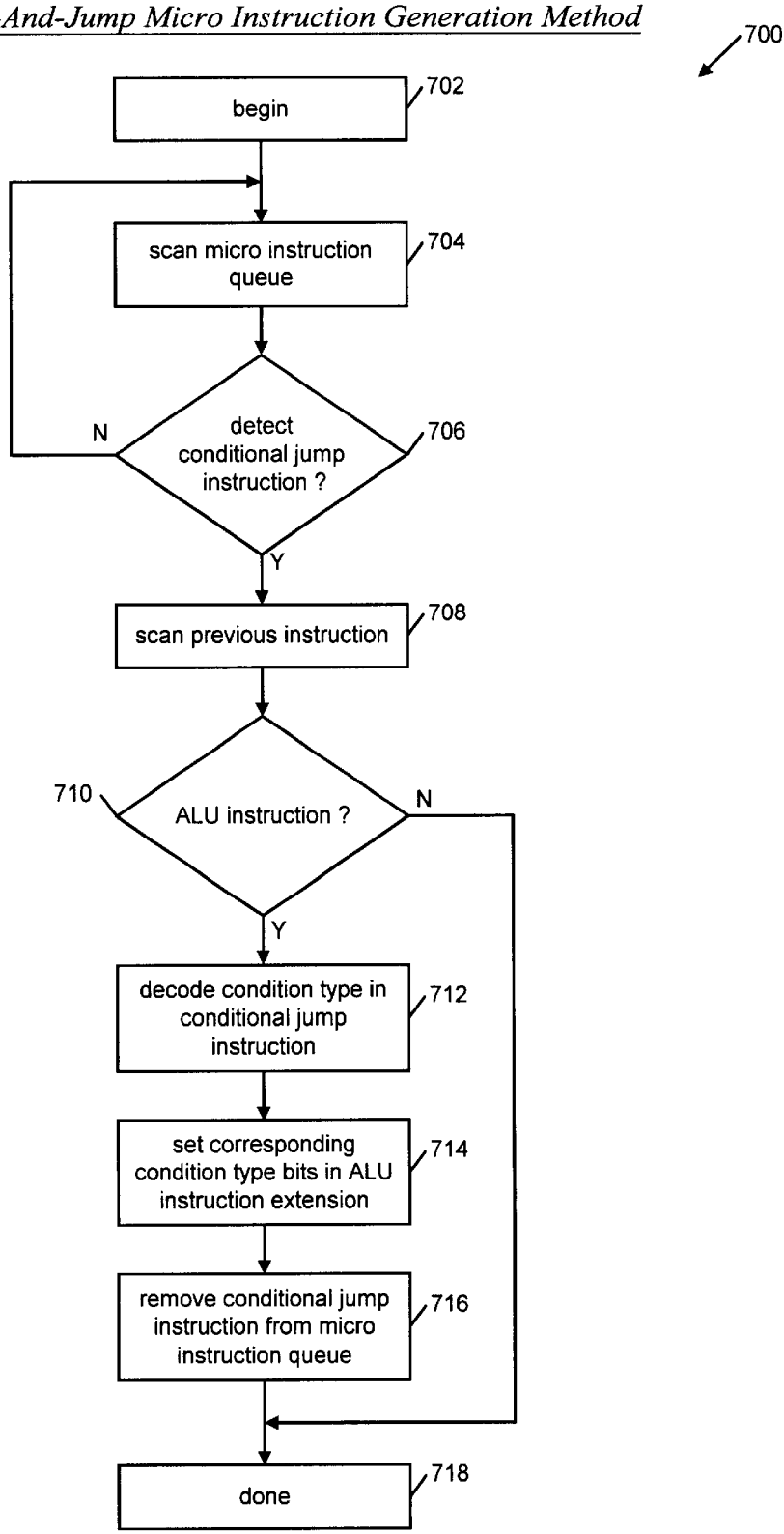
FIG. 7 is a flow chart of a method according to the present invention for generating a micro instruction to perform a compare-and-jump operation.

Now referring to FIG. 7, a flow chart 700 is presented illustrating a method according to the present invention for generating a micro instruction to perform a compare-and-jump operation.

Flow begins at block 702, wherein an instruction decoder in a microprocessor translates macro instructions into corresponding sequences of micro instructions. The micro instructions are placed into a micro instruction queue in order for execution by subsequent stages of the microprocessor. Flow then proceeds to block 704.

At block 704, instruction combination logic in the translate stage scans the contents of the micro instruction queue. Flow then proceeds to decision block 706.

At decision block 706, each micro instruction in the micro instruction queue is evaluated to determine if it is a conditional jump micro instruction. If not, then flow proceeds to block 704, wherein scanning of the queue contents continues. If a conditional jump micro instruction is detected within the queue, then flow proceeds to block 708.

At block 708, the micro instruction immediately preceding the conditional jump instruction in the queue is scanned. Flow then proceeds to decision block 710.

At decision block 710, the micro instruction immediately preceding the conditional jump instruction in the queue is evaluated to determine if it is an ALU instruction, that is, a micro instruction directing the microprocessor to perform an ALU operation. If so, then flow proceeds to block 712. If not, then flow proceeds to block 718.

At block 712, because an ALU instruction was detected immediately preceding the conditional jump micro instruction, it is determined that a compare-and-jump operation has been prescribed. Accordingly, the prescribed test, or condition type prescribed by the conditional jump micro instruction is determined. Flow then proceeds to block 714.

At block 714, condition type bits in an extension to the ALU instruction are set to indicate the prescribed test, thus forming a compare-and-jump micro instruction. Flow then proceeds to block 716.

At block 716, the conditional jump micro instruction is removed from the micro instruction queue, thus completing the compare-and-jump micro instruction combination. Flow then proceeds to block 718.

At block 718, the method completes.

Although the present invention and its objects, features, and advantages have been described in detail, other embodiments are encompassed by the invention. For example, the present invention has been particularly characterized in terms of a microprocessor pipeline that is oriented toward the efficient execution of load-ALU-store instructions. Execution of a load-ALU-store instruction exercises each of the load, execute, and store stages of a microprocessor according to the present invention. However, the present invention may also be employed to reduce the number of micro instructions that are required to perform an ALU-store operation from two micro instructions to one micro instruction.

In addition, the present invention has been described with respect to pairing of a conditional jump micro instruction with an ALU micro instruction, where the ALU micro instruction is described as being a micro instruction that directs the microprocessor to perform an ALU operation such as binary arithmetic, decimal arithmetic, or logic. Such functions are not intended to limit the scope of instructions to which the conditional jump micro instruction can be paired. Rather, any micro instruction whose execution results in an update to a flags register can be paired with a conditional jump instruction.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for performing a load-ALU-store operation, comprising:

translation logic, configured to receive a load-ALU-store macro instruction and to decode said load-ALU-store macro instruction into a load-ALU-store micro instruction, wherein said load-ALU-store micro instruction directs the microprocessor to retrieve an operand from a location in memory, to perform an ALU operation using said operand, and to store a result to said location in said memory;

load logic, coupled to said translation logic, configured to retrieve said operand from said location;

execution logic, coupled to said load logic, configured to perform said ALU operation, and to provide said result; and store logic, coupled to said execution logic, configured to receive said result, and to store said result in said location;

wherein said translation logic employs a control ROM to decode said load-ALU-store macro instruction.

2. The microprocessor as recited in claim 1, further comprising:

a micro instruction queue, coupled to said translation logic, configured to store a plurality of micro instructions that have been decoded by said translation logic.

3. The microprocessor as recited in claim 1, wherein said load-ALU-store micro instruction prescribes address components, and wherein address logic within the microprocessor employs said address components to generate an address corresponding to said location.

4. The microprocessor as recited in claim 3, wherein said address logic provides said address to said load logic and said store logic.

5. The microprocessor as recited in claim 1, wherein said ALU operation is a binary arithmetic operation, a decimal arithmetic operation, or a logic operation, and wherein said load logic accesses a data cache to retrieve said operand and places said operand in an operand buffer.

6. The microprocessor as recited in claim 5, wherein said execution logic retrieves said operand from said operand buffer to perform said ALU operation.

7. The microprocessor as recited in claim 6, wherein said execution logic comprises an ALU.

8. The microprocessor as recited in claim 6, wherein said execution logic places said result in a result register.

9. The microprocessor as recited in claim 6, wherein said store logic retrieves said result from said result register and accesses said data cache to store said result.

10. An apparatus in a microprocessor for executing a compare-and-jump operation, comprising:

a jump combiner, for detecting an ALU micro instruction and a conditional jump micro instruction, for indicating a condition test prescribed by said conditional jump micro instruction in a field of said ALU micro instruction, and for deleting said conditional jump micro instruction;

execution logic, coupled to said jump combiner, for receiving said ALU micro instruction, for performing an ALU operation prescribed by said ALU micro instruction, for generating a result of said ALU operation, and for updating a flags register to indicate a condition of said result; and store logic, coupled to said execution logic, for receiving said result and for performing said condition test on said flags register as prescribed by said field;

wherein the compare-and-jump operation is prescribed by said ALU micro instruction and said conditional jump micro instruction; and wherein said ALU operation is a binary arithmetic operation, a decimal arithmetic operation, or a logic operation.

11. The apparatus as recited in claim 10, wherein said condition test checks a state of said flags register.

12. The apparatus as recited in claim 11, wherein said flags register includes a carry flag, a parity flag, a zero flag, a sign flag, and an overflow flag.

13. The apparatus as recited in claim 10, further comprising:

a micro instruction queue, coupled to said jump combiner, configured to store a plurality micro instructions that have been decoded by said translation logic.

14. The apparatus as recited in claim 13, wherein said ALU micro instruction immediately precedes said conditional jump micro instruction in said micro instruction queue.

15. The apparatus as recited in claim 14, wherein said jump combiner deletes said conditional jump micro instruction from said micro instruction queue and shifts a following micro instruction forward in said micro instruction queue.

16. The apparatus as recited in claim 15, wherein said execution logic places said result in a result register.

17. The apparatus as recited in claim 16, wherein said store logic, if directed by said ALU micro instruction, retrieves said result from said result register and accesses a data cache to store said result in a memory location.

18. An apparatus for executing a compare-and-jump macro instruction sequence directing a microprocessor to perform a compare function, to update a flags register with a status corresponding to a result, and to evaluate the flags register to determine if the status satisfies a prescribed condition, the apparatus comprising:

an instruction decoder, configured to receive the compare-and-jump macro instruction sequence, and to translate the macro instruction sequence into an ALU micro instruction and a conditional jump micro instruction; and a jump combiner, coupled to said instruction decoder, configured to combine said ALU micro instruction and said conditional jump micro instruction into a compare-and-jump micro instruction, wherein said compare-and-jump micro instruction comprises:

an ALU micro operation field, directing the microprocessor to perform the compare function and to update the flags register with the status; and a conditional jump field, directing the microprocessor to evaluate the flags register.

19. The apparatus as recited in claim 18, wherein the compare function is a binary arithmetic operation, a decimal arithmetic operation, or a logic operation.

20. The apparatus as recited in claim 18, wherein the flags register includes a carry flag, a parity flag, a zero flag, a sign flag, and an overflow flag.

21. The apparatus as recited in claim 18, further comprising:

execution logic, coupled to said instruction decoder, for performing the compare function, for updating the flags register, and for providing the result in a result register; and store logic, coupled to said execution logic, for receiving the result from said result register, and for evaluating the flags register.

22. The apparatus as recited in claim 21, wherein said store logic, if directed by said ALU micro operation field, stores the result in a memory location.

23. A method for performing a compare-and-branch operation in a pipeline microprocessor, comprising:
- a) detecting an ALU micro instruction and a conditional branch micro instruction prior to their execution, wherein said detecting comprises:
  - i) monitoring a micro instruction queue to identify the conditional branch micro instruction; and
  - ii) confirming that the conditional branch micro instruction immediately follows the ALU micro instruction in the micro instruction queue;
- b) combining the ALU instruction and the conditional jump instruction into a compare-and-branch micro instruction;
- c) performing a compare operation prescribed by the compare-and-branch micro instruction to produce a result and a result status; and
- d) evaluating the result status in accordance with a condition prescribed by the compare-and-branch micro instruction.

24. The method as recited in claim 23, wherein said combining comprises:
- i) decoding the conditional branch micro instruction to determine the condition;
- ii) adding an extension to the ALU micro instruction to specify the condition; and
- iii) removing the conditional branch instruction from the micro instruction queue.

* * * * *